US010364842B2

(12) United States Patent
Pittsley et al.

(10) Patent No.: US 10,364,842 B2
(45) Date of Patent: Jul. 30, 2019

(54) LONG TRAVEL AIR BEARING LINEAR STAGE

(71) Applicant: NEW WAY MACHINE COMPONENTS, INC., Aston, PA (US)

(72) Inventors: Robert Pittsley, Claymont, DE (US); Nicholas Sotiropoulos, Glen Mills, PA (US)

(73) Assignee: New Way Machine Components, Inc., Aston, PA (US)

( * ) Notice: Subject to any disclaimer, the term of this patent is extended or adjusted under 35 U.S.C. 154(b) by 0 days.

(21) Appl. No.: 15/724,938

(22) Filed: Oct. 4, 2017

(65) Prior Publication Data

US 2018/0094673 A1    Apr. 5, 2018

Related U.S. Application Data (60) Provisional application No. 62/403,879, filed on Oct. 4, 2016.

(51) Int. Cl.
*F16C 32/06*   (2006.01)
*B65G 47/74*   (2006.01)
*B65G 51/03*   (2006.01)

(52) U.S. Cl.
CPC .......... *F16C 32/0618* (2013.01); *B65G 47/74* (2013.01); *B65G 51/03* (2013.01); *F16C 2326/10* (2013.01)

(58) Field of Classification Search
CPC ................... F16C 32/0618; F16C 29/025
See application file for complete search history.

(56) References Cited

U.S. PATENT DOCUMENTS

| 3,508,430 A * | 4/1970 | Edmondson ............... B21J 9/02 100/214 |
| 7,084,522 B2 * | 8/2006 | Wobben ................. F03D 1/065 290/44 |
| 7,982,455 B2 * | 7/2011 | Ito .......................... G01P 3/443 324/174 |

(Continued)

FOREIGN PATENT DOCUMENTS

| JP | 2010-96311 | * | 4/2010 |
| KR | 2014-0114873 | * | 9/2014 |

OTHER PUBLICATIONS

Machine translation of KR 2014-0114873.*
Machine translation of JP 2010-96311.*

*Primary Examiner* — Thomas R Hannon
(74) *Attorney, Agent, or Firm* — Volpe and Koenig, P.C.

(57) ABSTRACT

A long travel aerostatic linear stage includes a plurality of rails, a plurality of planar bearing plates, and a plurality of porous media gas bearing. The plurality of planar bearing plates are aligned with and attached to the rails. Each planar bearing plate includes a plurality of metal plates having machined air bearing surfaces. The plurality of porous media gas bearings float on the bearing plates in a non-contact frictionless manner to support a traversing load and control lateral motion of the rails. The rails may include at least one rail which supports the traversing load and at least one rail which controls the lateral motion. The bearing plates are restrained and attached to the rails in a manner that ensures the planar nature of the bearing plates are maintained and the air gap is effective.

5 Claims, 10 Drawing Sheets (56) References Cited

U.S. PATENT DOCUMENTS

2006/0251344 A1* 11/2006 Weis ................. B23Q 1/38
384/12
2008/0236997 A1 10/2008 Ebihara
2009/0297075 A1 12/2009 Muneishi
2012/0057140 A1 3/2012 Aoki

* cited by examiner

LONG TRAVEL AIR BEARING LINEAR STAGE

CROSS-REFERENCE TO RELATED APPLICATIONS

The present application claims priority to U.S. Provisional Application No. 62/403,879, filed Oct. 4, 2016, which is hereby incorporated in its entirety.

FIELD OF INVENTION

The present application relates to an externally-pressurized porous media gas bearing, and, more particularly to a porous media gas bearing comprising a long, non-contact linear stage.

BACKGROUND

Gas bearings are a particular type of bearing which use pressurized gas, such as air, to maintain a gap between a moving component and the bearing to reduce friction. A gas source typically supplies pressurized gas to a porous media which expels the gas to maintain the gap. In some situations, gas bearings are used for long, non-contact linear stages to move material across long areas. Due to the length of travel and the size of the air gap, it may be difficult to maintain non-contact at all locations of the material being moved. A very flat surface is necessary for the proper functioning of air bearings due to the fact that the air gap (which exists between the air bearing surface and a load-carrying member) is very small. The present disclosure is directed to this problem of moving material over a long distance using an air bearing and with ensuring that a bearing surface is completely or essentially planar to produce an effective air gap which allows traversal across long linear distances.

SUMMARY

The following illustrations and drawings are presented with regard to the use of externally pressurized porous media gas bearings comprising a long, non-contact linear stage. The length of travel, for example in excess of five meters, is made possible not merely by the use of porous media air bearings, but also due to the novel methodology of ensuring that the entire length of the air bearing surfaces are maintained in an extremely flat configuration. In an exemplary method, a series of planar elements are machined and attached to a rail in order to provide a completely flat bearing surface.

In one aspect, the present disclosure is directed to a long travel aerostatic linear stage. The long travel aerostatic linear stage includes a plurality of rails, a plurality of planar bearing plates, and a plurality of porous media gas bearings. The plurality of planar bearing plates are aligned with and attached to the rails. Each planar bearing plate includes a plurality of metal plates having machined air bearing surfaces The plurality of porous media gas bearings float on the bearing plates in a non-contact frictionless manner to support and control lateral motion of a traversing load on the rails. The rails may include at least one rail which supports the traversing load and at least one rail which controls the lateral motion.

In another aspect, the present disclosure is directed to a method of assembling a long travel aerostatic linear stage. The method includes machining a plurality of metal plates to create bearing surfaces on one side and arranging the plurality of metal plates end to end in a linear fashion bearing down on a precision surface. The method also includes attaching a rail to the back surface of the plurality of metal plates to create a rail having a bearing surface. The method further includes repeating the machining, the arranging, and the attaching steps to create a plurality of rails having bearing surfaces and mounting each of the plurality of rails having bearing surfaces to a frame using adjustable mounts. The method additionally includes aligning the rails having bearing surfaces using the adjustable mounts in a parallel planar configuration.

BRIEF DESCRIPTION OF THE DRAWING(S)

The foregoing summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure is directed to a long-travel linear air bearing stage assembly. The assembly includes a plurality of air bearings, which are mounted in a location to travel along a bearing plate of an associated rail. The bearing plates may include a series of precision machined planar elements which are connected to a rail to form a completely flat bearing surface. The air bearings float on and traverse across the bearing plates of the rails with an axial gap maintained therebetween. The air bearings are attached to an associated element, such as a moving stage or platform. In this way, the element can be moved across long distances using air bearings by floating the air bearings on the bearing plates. Alternatively, the air bearings may be stationary and the rails are attached to the moving element for linear travel.

Figure 1:
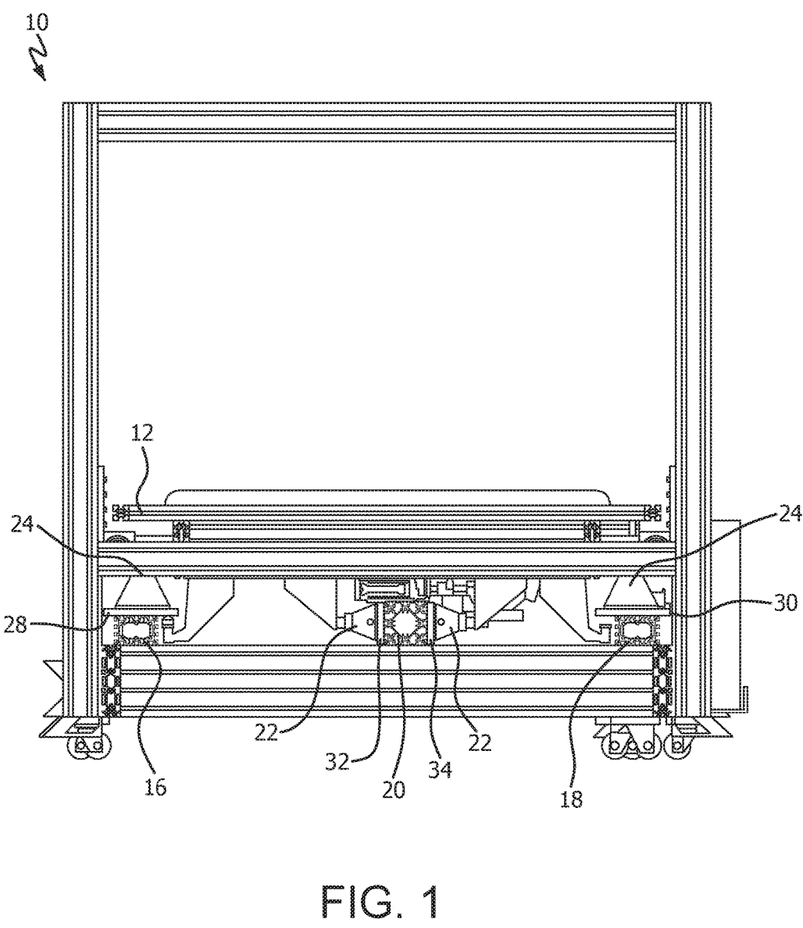
FIG. 1 is a side view illustration of a long travel, linear air bearing stage.

FIG. 1 illustrates an exemplary embodiment of a long-travel aerostatic linear stage assembly 10. The assembly 10 includes a moving element 12, which may be a moving stage or platform for carrying a payload. The moving element 12 is configured to be moved in a linear direction across a relatively long distance using one or more bearings. In this way, the moving element 12 may support, control, and move a traversing payload in a linear direction across a relatively long distance.

In the illustrated embodiment, the assembly 10 includes a plurality of air bearings 22, 24 which are attached to and positioned under the moving element 12. The assembly also includes associated rail assemblies 16, 18, and 20 which run in the direction of linear travel of the moving element 12. The air bearings 22, 24 are configured to float with respect to the rails 16, 18, and 20 in order to produce linear movement of the moving element 12 in the direction of the rails 16, 18, and 20. The rails 16, 18, and 20 are preferably generally rectangular and formed from an extruded material. However, it should be understood that the rails 16, 18, and 20 could have other configurations. An alternative embodiment of the rails 16, 18, and 20 will also be described below.

The bearings 22, 24 are porous media air bearings and are connected to a pressurized gas source. The gas source may be air, nitrogen, or any other suitable gas. In the embodiment of FIG. 1, the bearings 22, 24 include one or more inner air bearings 22 and one or more outer air bearings 24. The inner air bearings 22 provide control in the direction of travel (e.g., a direction perpendicular to the plane of the page of FIG. 1) while the outer air bearings 24 support the payload weight.

In an exemplary embodiment, the assembly 10 includes four outer air bearings 24 and four inner air bearings 22. The four outer air bearings 24 are positioned on opposing sides of the assembly 10 and on opposing sides of the four inner air bearings 22. The four outer air bearings 24 are positioned on top of respective rails 16, 18, while the four inner air bearings respectively face opposing lateral sides of the rail 20.

Each rail 16, 18, and 20 may include one or more of a plurality of bearing plates 28, 30, 32, 34 associated therewith. For example, outer rails 16, 18 may include a single bearing plate 28, 30, respectively, while middle rail 20 includes a pair of opposing bearing plates 32, 34. The bearing plates 28, 30, 32, 34 are formed as a series of individual planar elements 37 which span in the axial direction of the rails 16, 18, and 20. The bearing plates 28, 30, 32, 34 provide planar surfaces with which an air gap is maintained with the opposing surface of an associated one of the air bearings 22, 24. The present disclosure includes a method of manufacturing the bearing plates 28, 30, 32, 34 that ensures that the surface which interfaces with the porous media bearing surface (of air bearings 22, 24) is completely planar such that the air gap is effective and no contact is made despite the small size of the air gap.

Figure 2:
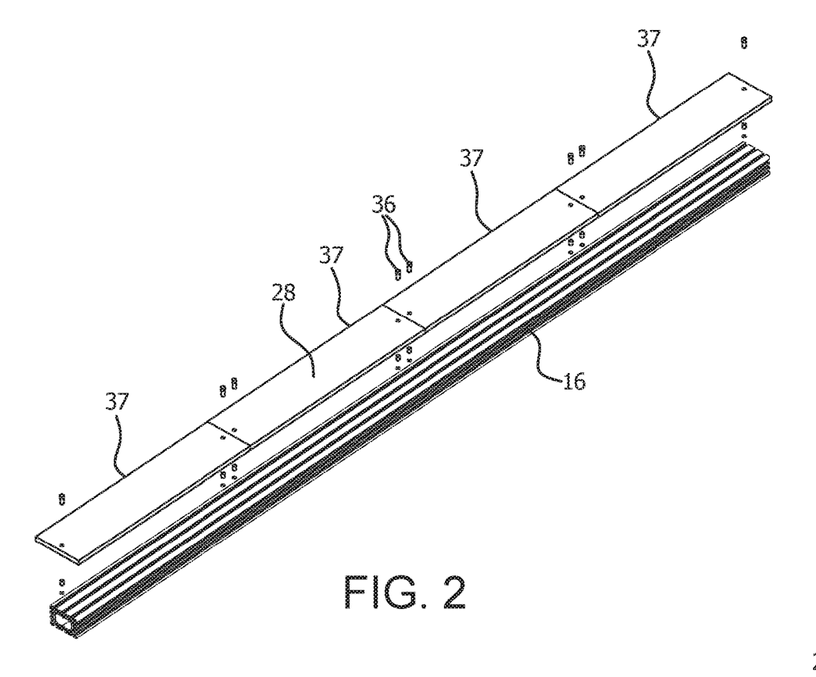
FIG. 2 is an exploded view of a top rail of the linear air bearing stage.
Figure 3:
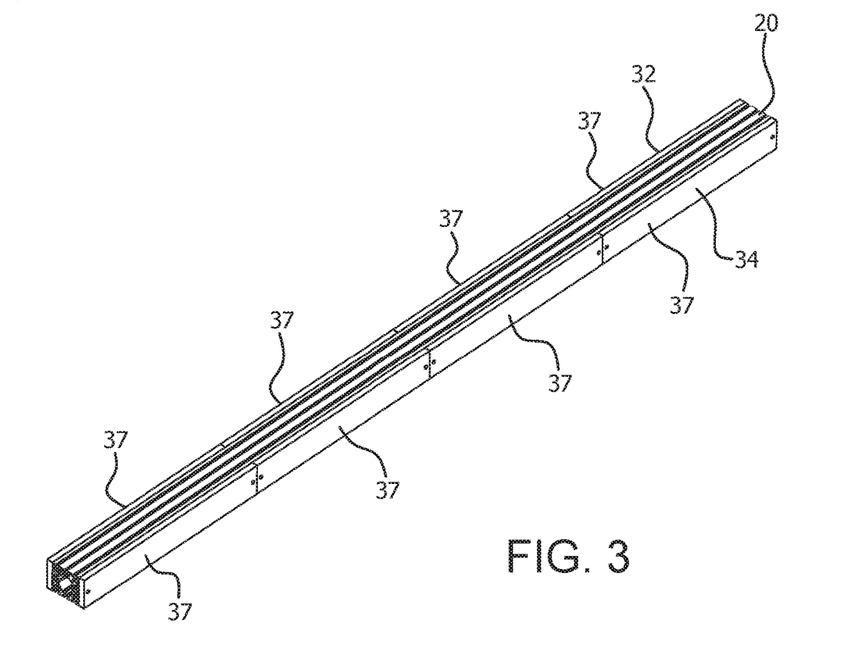
FIG. 3 is an isometric view of a middle rail of the linear air bearing stage.

FIG. 2 illustrates an exemplary embodiment of the rail 16 and the associated bearing plate 28 that is formed as a series of individual planar elements 37. In an exemplary embodiment, the bearing plate 28 is attached to the top of the rail 16. FIG. 2 is also indicative of the rail 18 and associated bearing plate 30. FIG. 3 illustrates an exemplary embodiment of the middle rail 20 and the associated bearing plates 32, 34 that are each formed as a series of individual planar elements 37. The bearing plates 32, 34 are attached on opposing lateral sides of the middle rail 20.

Figure 4:
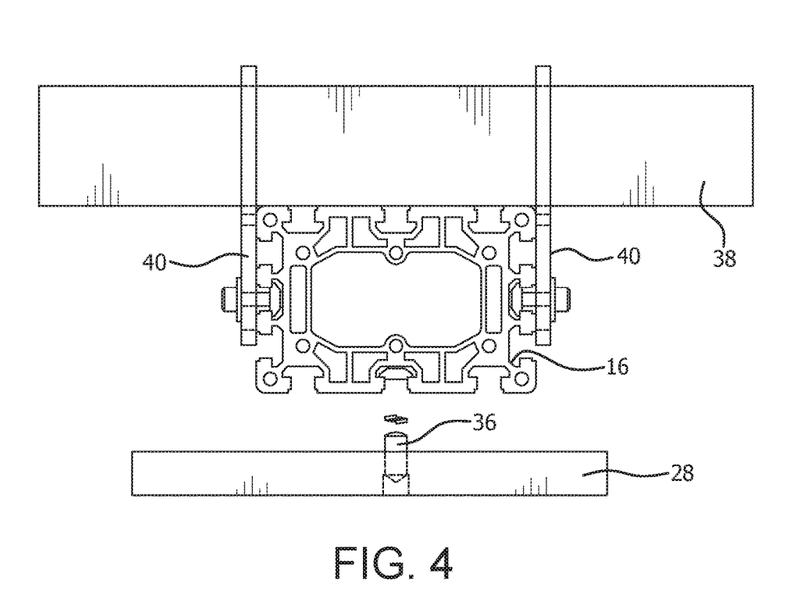
FIG. 4 is an axial view of the top rail assembly disassembled from plurality of planar bearing plates.
Figure 5:
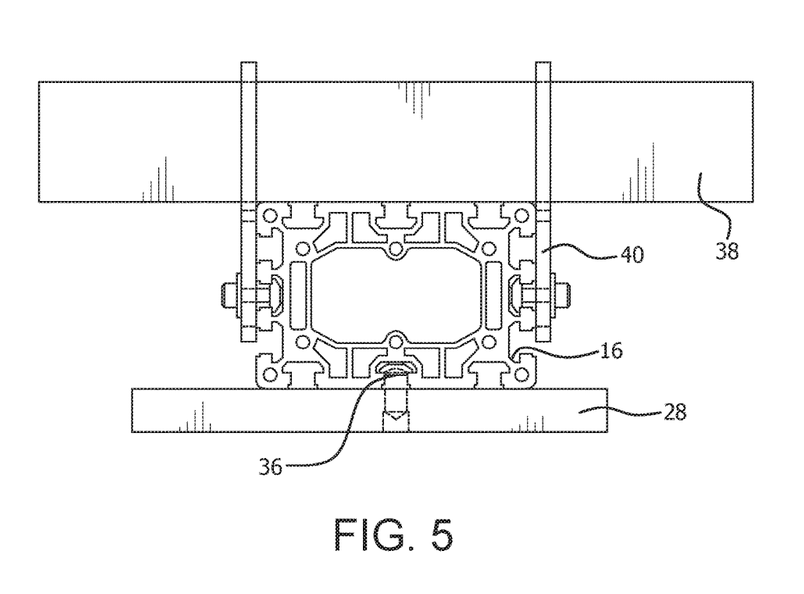
FIG. 5 is a side view of the top rail assembly assembled on plurality of planar bearing plates.

FIGS. 4 and 5 illustrate an exemplary process for attaching the bearing plate 28 to the rail 16. The bearing plate 28 is preferably glued to the rail 16. In order to ensure that the glue attachment achieves a completely or essentially planar surface of the bearing plate 28, additional features are utilized during the process.

In an exemplary embodiment, the bearing plate 28 includes dowel pins 36 which are positioned in the bearing plate 28 prior to attachment to the rail 16. The rail 16 is positioned on the bearing plate 28 and glued in place. The rail 16 is attached to a parallel element 38 on an opposite side from the bearing plate 28. The parallel element 38 may be attached to the rail 16 by straps 40. The dowel pins 36, parallel element 38, and straps 40 may constitute a restraining assembly which helps to maintain the position of the bearing plate 28 in a lateral fashion during attachment to the rail 16. In addition, weighted elements may be positioned at various spaced locations on top of the parallel element 38 or rail 16. Gage blocks may also be used to ensure that a completely or essentially planar surface is achieved (shown in FIGS. 7A, 7B, 8, and 9 with respect to the middle rail 20). It should be understood that the rail 18 and bearing plate 30 may be similarly attached to each other.

Figure 6A:
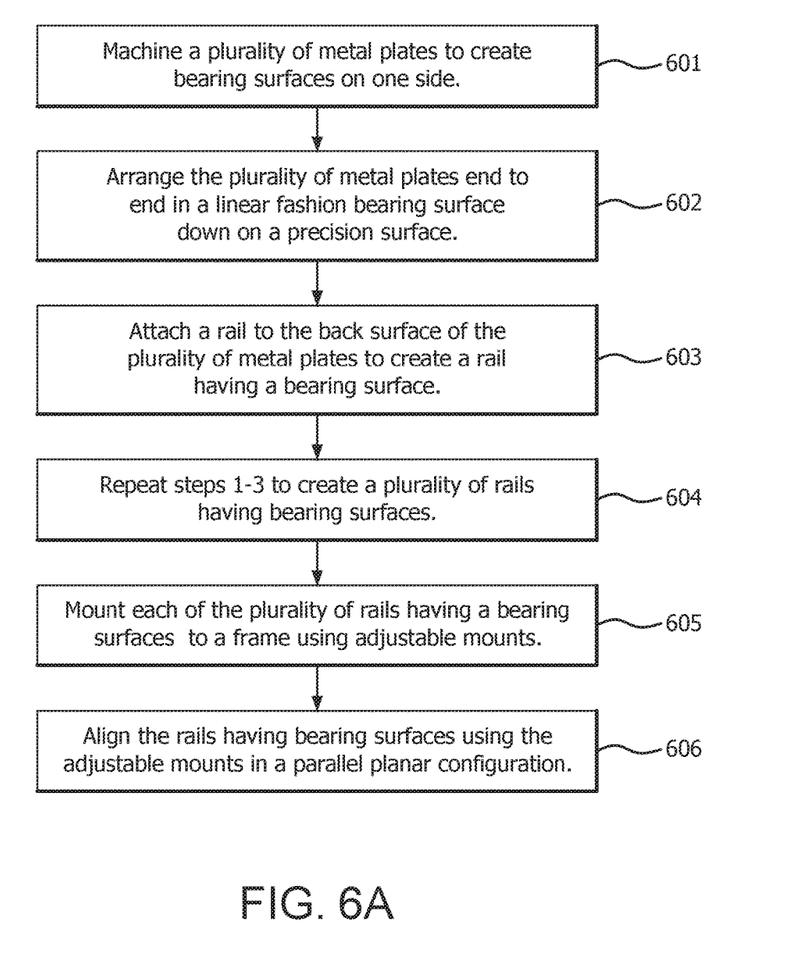
FIG. 6A is a flow diagram of an example method of assembling a long, non-contact linear stage.
Figure 6B:
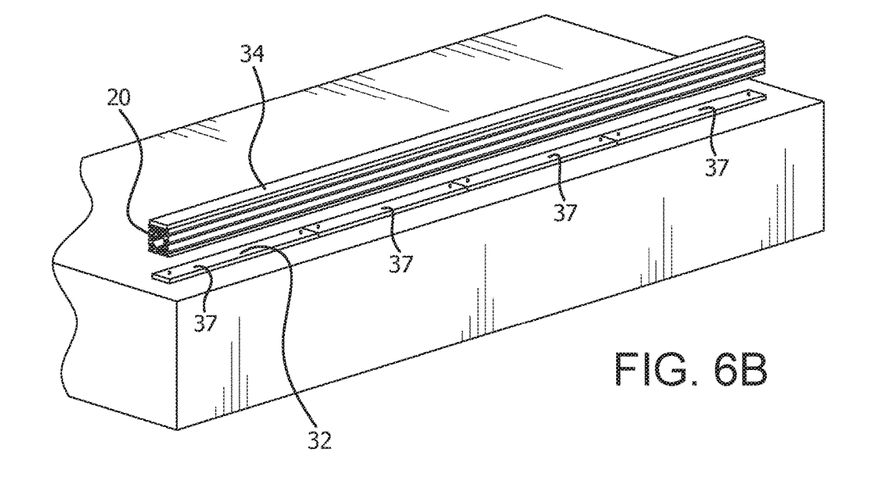
FIG. 6B is a is an exploded view of the middle rail.
Figure 6C:
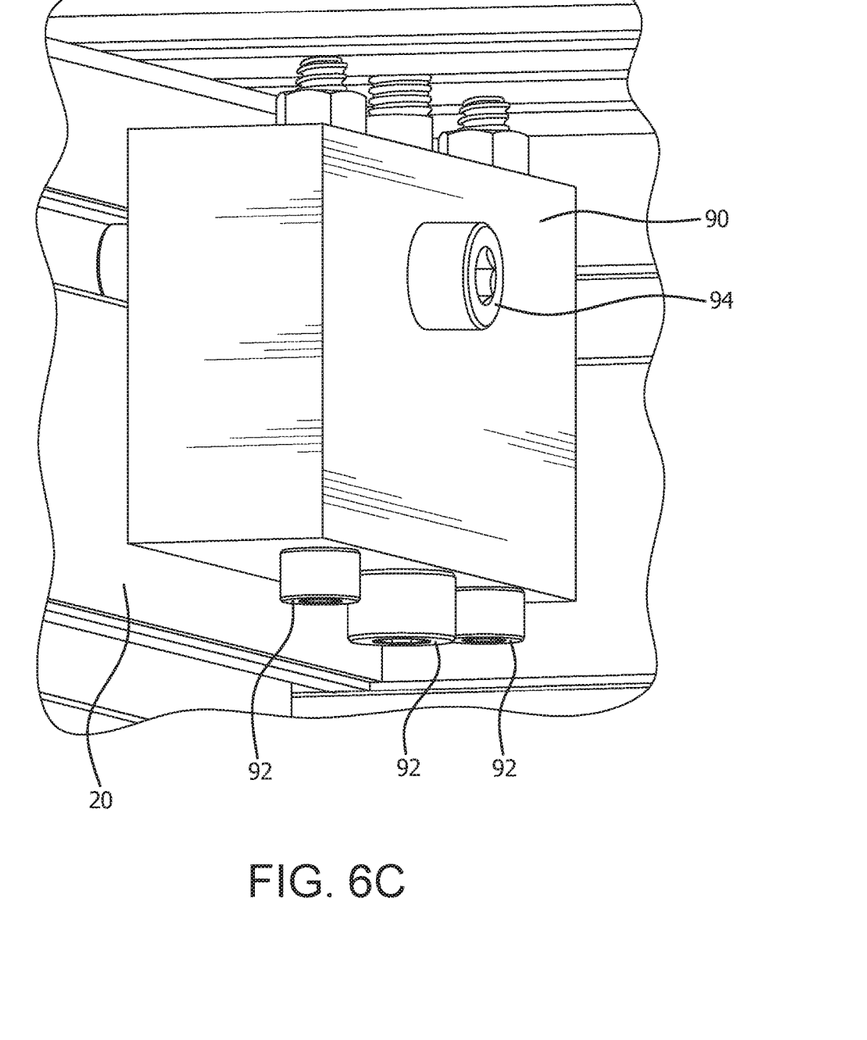
FIG. 6C is an exploded view of an example adjustable mount.
Figure 7A:
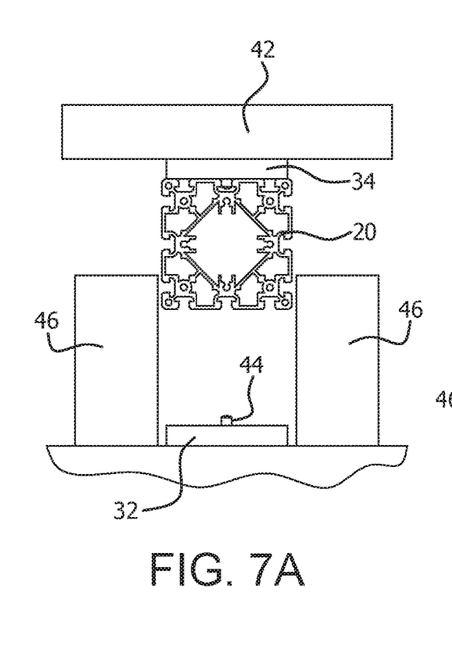
FIG. 7A is an axial view of the middle rail assembled to one plurality of bearing plates.
Figure 7B:
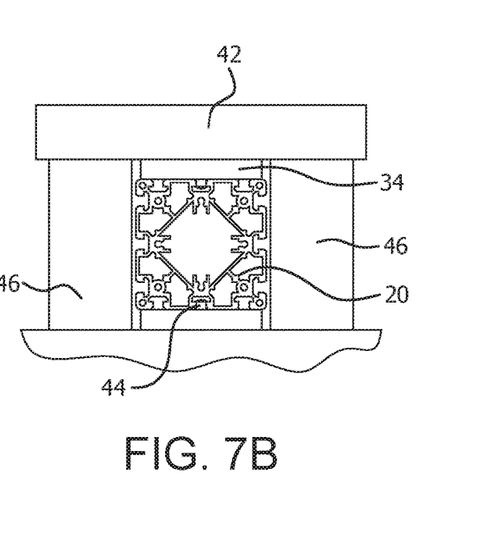
FIG. 7B is an axial view of the middle rail assembled with plurality of bearing plates on two opposing sides.
Figure 8:
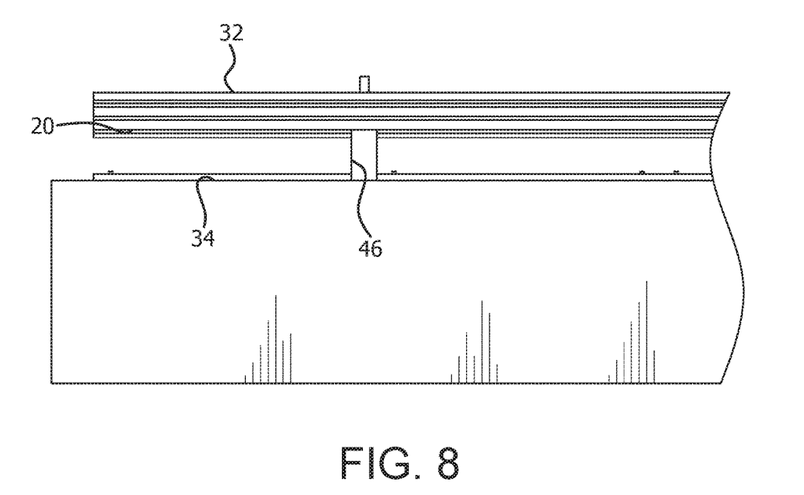
FIG. 8 is a side view of the middle rail assembly.
Figure 9:
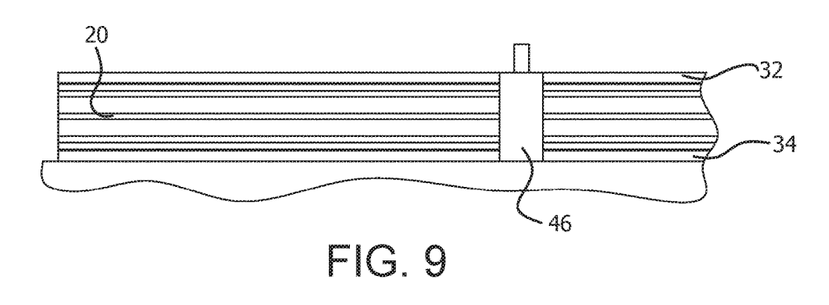
FIG. 9 is a side view of the middle rail assembly.

FIGS. 6A, 6B, and 6C illustrate another exemplary process 600 for assembling a long, non-contact linear stage. The process begins by providing a plurality of metal plates having machined air bearing surfaces on one side (Step 601). Next, the metal plates having machined air bearing surfaces on one side are arranged end to end in a linear fashion with the bearing surface facing down on a precision surface (Step 602). A rail may then be attached to the back surface of the plurality of metal plates to create a rail having an air bearing surface (Step 603). Steps 601-603 may be repeated to create a plurality of rails having air bearing surfaces (Step 604). Then each of the plurality of rails having air bearing surfaces are mounted to a frame using adjustable mounts (Step 605). Finally, the rails having air bearing surfaces are aligned using the adjustable mounts in a parallel planar configuration (Step 606).

It should be noted that Steps 601-603 may be repeated on a different side of a rail that already has at least one air bearing surface in order to create a rail having multiple air bearing surfaces, such as rail 20 in FIG. 1. Also, at step 602 it is preferred that the rail is attached to the metal plates 37 using glue or epoxy.

FIG. 6B shows an example of a rail 20 being attached to a plurality of metal plates 37 arranged end to end in a linear fashion with the bearing surface facing down on a precision surface 33. While, in the prior art, bearing surfaces have previously been limited by the size of machining tools capable of creating an air bearing surface, the process described in steps 601-603 enables one to assemble an air bearing surface from a plurality of segments without the cost or excessive size of large scale machining equipment, and to assemble a long air bearing guide surface without being limited by the size of any available machining equipment As shown in FIG. 6B, the bearing plate 32 may be attached to the middle rail 20 in much the same way as the bearing plate 28 being attached to the rail 16. It should be noted that a restraining assembly including dowel pins, parallel elements, straps, gage blocks, and/or weighted elements may be used to help force the bearing plate 32 into a planar position when glued to the middle rail 20.

FIG. 6C shows an example of an adjustable mount 90 that may be used in conjunction with Step 605. The example adjustable mount 90 is attached to rail 20 and includes jacking screws 92 and 94 to align the plurality of rails having air bearing surfaces in a substantially parallel planar configuration. FIGS. 7A, 7B, 8, and 9 illustrate an example process of attaching the second bearing plate 34 to the opposing side of the rail 20. As shown, a parallel element 42 may be positioned on top of the already-attached bearing plate 34. The bearing plate 32 includes dowels 44 which are received in cavities in the rail 20. Gage blocks 46 are positioned to ensure that the bearing plate 32 is positioned parallel to the parallel element 42 (i.e., the heights of the gage blocks 46 are established to match a distance equal to the sum of the rail 20, the bearing plates 32, 34 and the glue gaps used to attach the bearing plates 32, 34 to the rail 20).

The disclosed attachment processes ensure that the bearing plates 28, 30, 32, and 34 are attached to the rails 16, 18, 20 in a manner that produces completely planar surfaces for interfacing with the bearing surfaces of the air bearings 22, 24. The bearing plates 28, 30, 32, and 34 are held consistently at the same planar location along the entire location of the rails 16, 18, 20 during attachment, thereby producing the planar surfaces which will allow for an effective air gap during operation of the assembly 10. It should be understood that other steps or procedures may be incorporated into the disclosed methods. In one alternative, a welded frame may be implemented to established the locations of the rails and provide additional support and rigidity. In this alternative, adjustable mounts may be positioned in sufficient locations to allow for alignment of the bearing surfaces even when the frame is somewhat flexible.

Figure 10A:
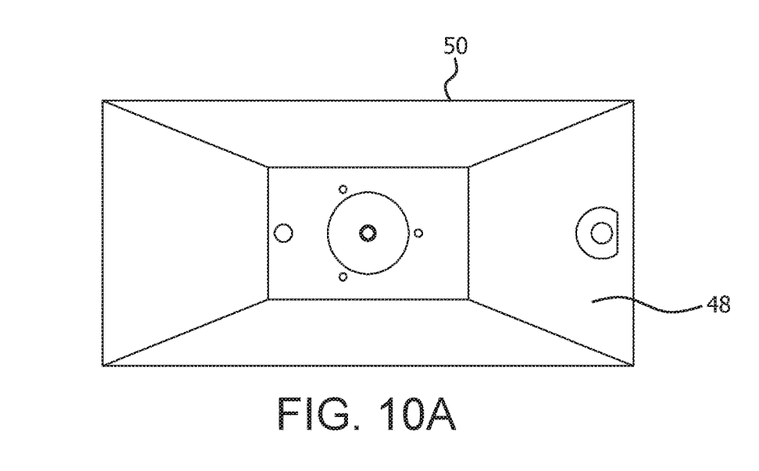
FIG. 10A is a top view of a porous media bearing.
Figure 10B:
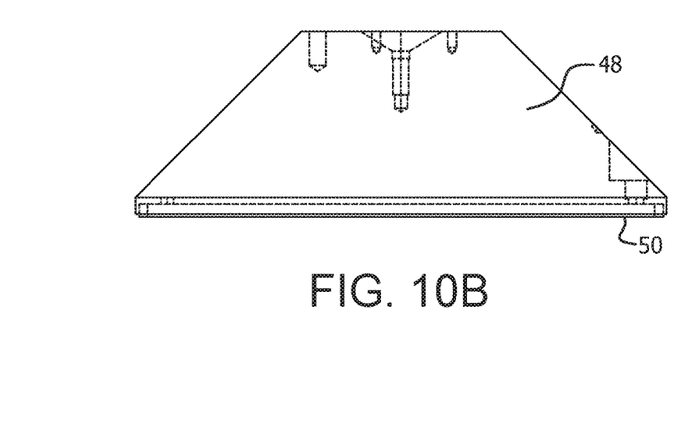
FIG. 10B is a first side view of the porous media bearing.
Figure 10C:
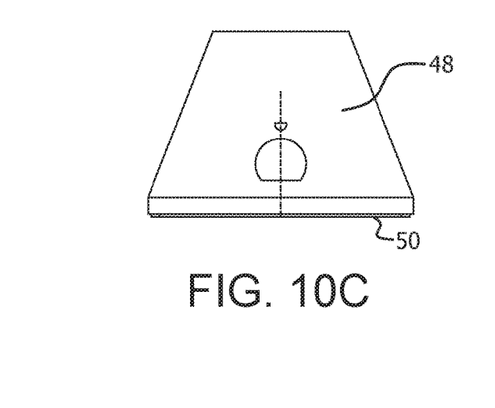
FIG. 10C is a second side view of the porous media bearing.

FIGS. 10A, 10B, and 10C illustrate an exemplary air bearing 22, although the illustration could equally be used to represent an air bearing 24. Each bearing 22 may be comprised of a housing 48 and an integral porous media air bearing media 50. The housing 48 may be made of any metal but may also be made from other materials. In some embodiments, the housing 48 and media 50 may be integral such that the bearing 22 is a monolithic member (i.e. porous throughout). Alternatively, the porous media 50 is attached to the bearing housing 48 and gas is introduced into the porous media 50 through the housing 48. For example, a hole may be drilled into the side of the housing 48 and an air fitting may be attached. Gas is supplied to the air fitting and through the porous media 50 such that an air gap is created with an opposing bearing plate. The attachment of the bearing plates described herein maintains a very flat and long surface which allows the bearings 22, 24 to float across a long distance to carry a traversing load without interference despite the air gap being very small.

The disclosed embodiment of the linear stage assembly 10 includes the rails 16 and 18 with the associated bearing plates 28, 30 positioned in the horizontal plane. The outer air bearings 24 float on these surfaces via pressurized gas in order to support a traversing load as it travels in the linear direction of the rails. The rail 20 and bearing plates 32, 34 are positioned in the vertical plane with the associated inner air bearings 22 being directed inward toward the vertically-oriented surfaces. The middle rail 20 thereby provides control for lateral movement to help ensure that the moving element 12 continues in a linear direction while supported on the outer rails 16, and 18 without deviating from side-to-side.

Figure 11:
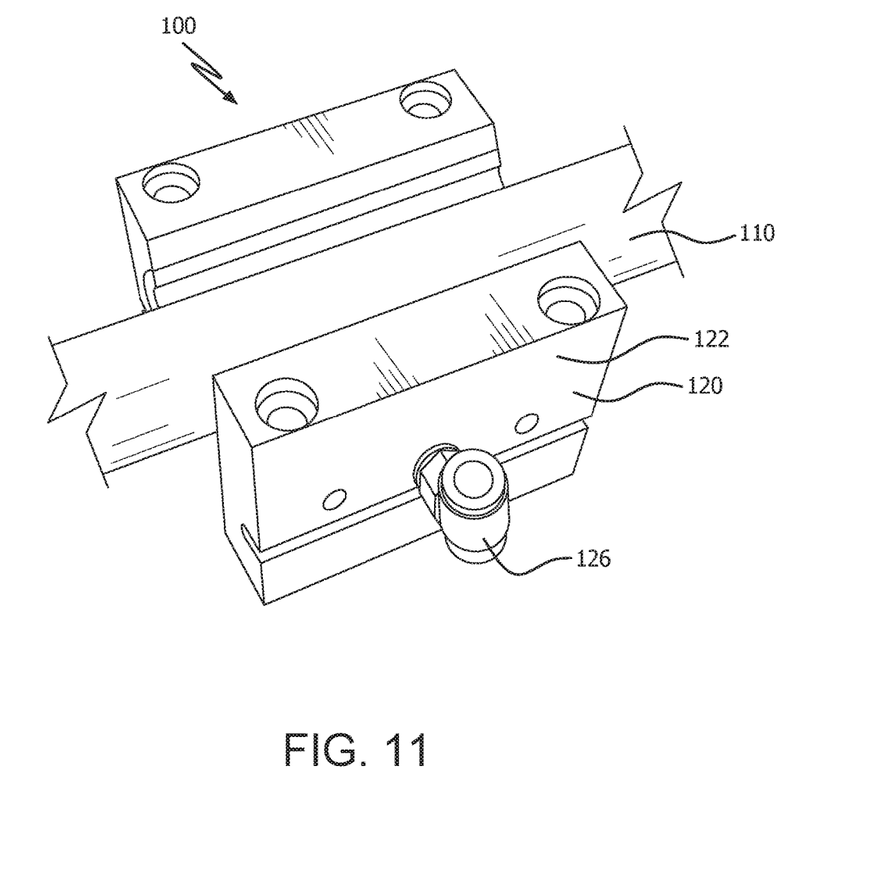
FIG. 11 is an isometric view of an alternative linear air bearing assembly.
Figure 12:
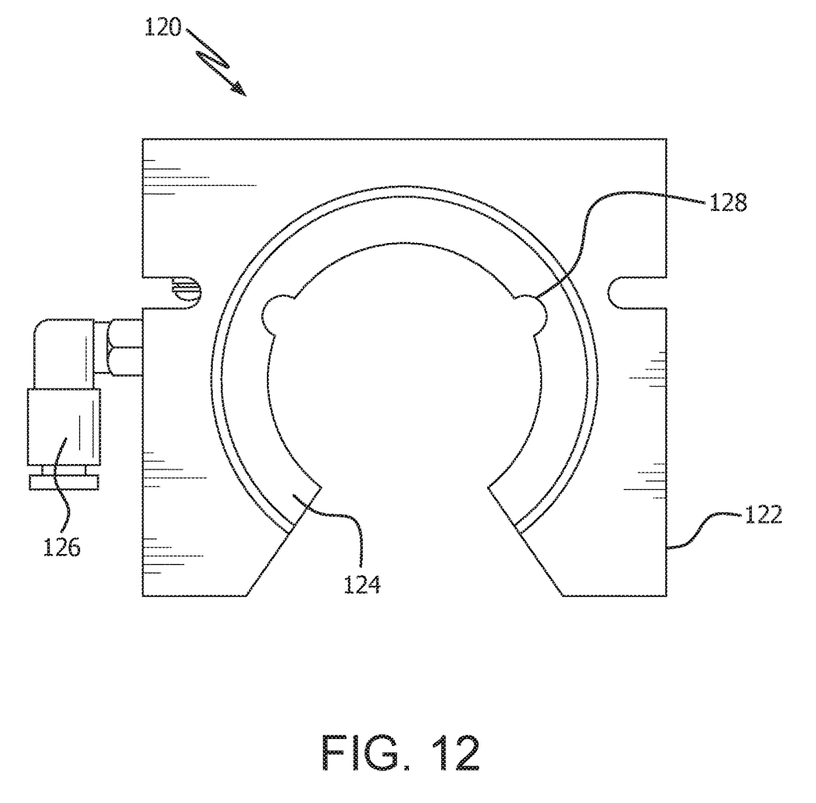
FIG. 12 is a side view of an alternative porous media shoe that may be used in conjunction with the linear air bearing of FIG. 11.

FIGS. 11 and 12 illustrate an alternative embodiment of an air bearing assembly for a long-travel linear stage 100. The assembly includes a rail 110 which is formed as a cylindrical rod. The cylindrical rail 110 is substituted for one or more of the rails 16, 18, or 20 in the assembly 10. In place of the air bearings 22, 24, this embodiment includes a circular bearing element 120. The circular bearing element 120 is formed as a 270 degree bearing.

In this embodiment, maintaining a proper height for the rail is a similar concern to maintaining the bearing plates 28, 30, 32, 34 in a completely planar manner. In order to achieve this feature, the bearing element 120 is open on the bottom (shown as the top in FIG. 12) which allows the rail 110 to be supported at intermittent points using adjustable mounts in order to maintain a straight rod (without sagging) in a planar fashion. The open nature of the bearing element 120 ensures that the supports for the rail are not interfered with by the moving bearing element 120.

FIG. 12 illustrates an example of the bearing element 120 which includes a housing 122 and a porous media 124. The porous media 124 is assembled into the housing 122 by a gluing operation, or other means of attachment. During operation, gas is introduced into the fitting 126 and delivered to the porous media 124 to maintain an air gap with the cylindrical rail 110.

The bearing element 120 includes one or more scallop portions 128 in the porous media 124. The scallop portions help to prevent an improper build-up of pressure between the rail 110 and the porous media 124, which might otherwise cause flexing of the housing 122, which could prevent proper functioning. The scallop portions 128 allow the porous media 124 to act similarly to independent radial air bearings.

In all disclosed embodiments, supplied gas may be any gas, such as air or nitrogen. The porous media may be comprised of any porous or sintered material, such as graphite, carbon, silicon carbide, tungsten carbide, alumina, carbon-carbon, or a ceramic matrix composite. However, it should be understood that the materials and gases are not limited to the above described examples. Moreover, while the invention is described with respect to porous media air bearings, it should be understood that the long travel air bearings of the present invention could alternatively incorporate orifice bearings at the interface with the flat surfaces of the bearing plates. The porous media may be manufactured using ceramic casting techniques known in the art, but may also employ other methods such as 3-D printing.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A method of assembling a long travel aerostatic linear stage, the method comprising:

machining a plurality of metal plates to create bearing surfaces on one side;

arranging the plurality of metal plates end to end in a linear fashion bearing surface down on a precision surface;

attaching a rail to the back surface of the plurality of metal plates to create a rail having a bearing surface;

repeat the machining, the arranging, and the attaching steps to create a plurality of rails having bearing surfaces;

mounting each of the plurality of rails having bearing surfaces to a frame using adjustable mounts; and aligning the rails having bearing surfaces using the adjustable mounts in a parallel planar configuration.

2. The method of claim 1 wherein the attaching a rail to the back surface of the plurality of metal plates step includes using glue or epoxy to attach the rails.

3. The method of claim 1 wherein the adjustable mounts include jacking screws to align the rails.

4. The method of claim 1 wherein the machining, the arranging, and the attaching step are repeated using a rail with an existing bearing surface on one side to create a rail having two bearing surfaces.

5. The method of claim 1 further comprising providing air bearing shoes to ride on each of the plurality of bearing surfaces.

\* \* \* \* \*